(12) United States Patent
Hogg

(10) Patent No.: US 8,576,509 B1
(45) Date of Patent: Nov. 5, 2013

(54) DISK DRIVE CONFIGURING DUAL FLY HEIGHT ACTUATORS DURING WRITE OPERATION

(75) Inventor: Dennis W. Hogg, Laguna Hills, CA (US)

(73) Assignee: Western Digital Technologies, Inc., Irvine, CA (US)

(*) Notice: Subject to any disclaimer, the term of this patent is extended or adjusted under 35 U.S.C. 154(b) by 254 days.

(21) Appl. No.: 13/217,058

(22) Filed: Aug. 24, 2011

(51) Int. Cl.
*G11B 21/02* (2006.01)

(52) U.S. Cl.
USPC .......................................................... 360/75

(58) Field of Classification Search
None
See application file for complete search history.

(56) References Cited

U.S. PATENT DOCUMENTS

| | | | |
|---|---|---|---|
| 7,023,647 B2 | 4/2006 | Bloodworth et al. | |
| 7,088,545 B1 * | 8/2006 | Singh et al. | 360/75 |
| 7,190,543 B2 | 3/2007 | Suk | |
| 7,324,299 B1 | 1/2008 | Schreck et al. | |
| 7,330,323 B1 * | 2/2008 | Singh et al. | 360/48 |
| 7,375,914 B1 * | 5/2008 | Dieron et al. | 360/75 |
| 7,400,473 B1 | 7/2008 | Krajnovich et al. | |
| 7,468,854 B2 * | 12/2008 | Yamashita et al. | 360/75 |
| 7,502,205 B1 | 3/2009 | Hurtado et al. | |
| 2001/0050826 A1 * | 12/2001 | Helsel et al. | 360/75 |
| 2006/0092550 A1 * | 5/2006 | Ishii et al. | 360/75 |
| 2007/0053092 A1 * | 3/2007 | Emo et al. | 360/46 |
| 2008/0043363 A1 * | 2/2008 | Yamashita et al. | 360/75 |
| 2008/0068739 A1 * | 3/2008 | Oyamada et al. | 360/75 |
| 2009/0251828 A1 | 10/2009 | Schreck et al. | |
| 2010/0002330 A1 * | 1/2010 | Lille | 360/59 |
| 2011/0013316 A1 | 1/2011 | Brand | |
| 2011/0244273 A1 * | 10/2011 | Mate et al. | 428/846.6 |

* cited by examiner

*Primary Examiner* — Peter Vincent Agustin

(57) ABSTRACT

A disk drive is disclosed wherein during a write operation a write fly height actuator is configured with a pre-heat value and a read fly height actuator is configured with a read value. When the head is over a target data sector, the write fly height actuator is configured with a first write value and the read fly height actuator is configured with a second write value, and data is written to the target data sector. When the head transitions from writing data to the target data sector to reading a servo sector, the write fly height actuator is configured with the pre-heat value and the read fly height actuator is configured with a read value. After reading the servo sector, the write fly height actuator is configured with the first write value and the read fly height actuator is configured with the second write value.

18 Claims, 3 Drawing Sheets

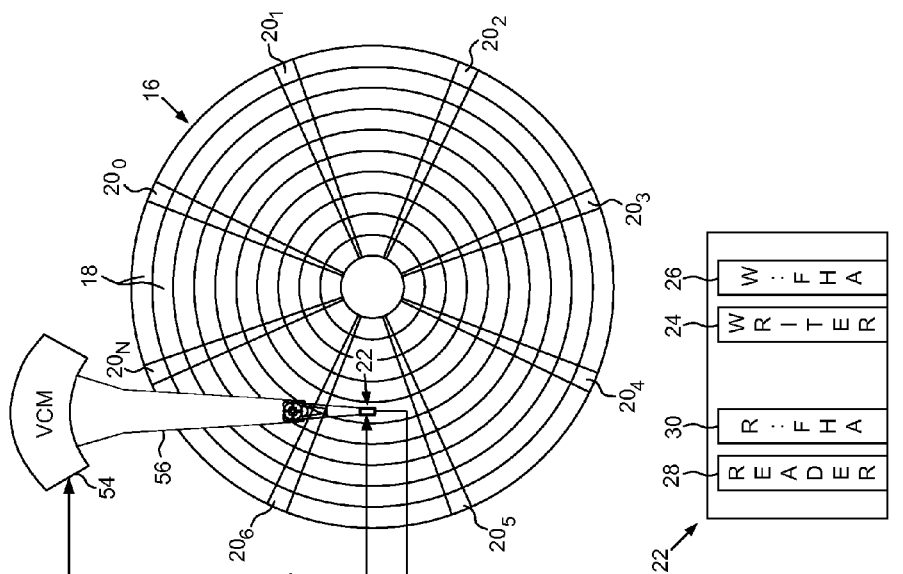
FIG. 2A
FIG. 2B
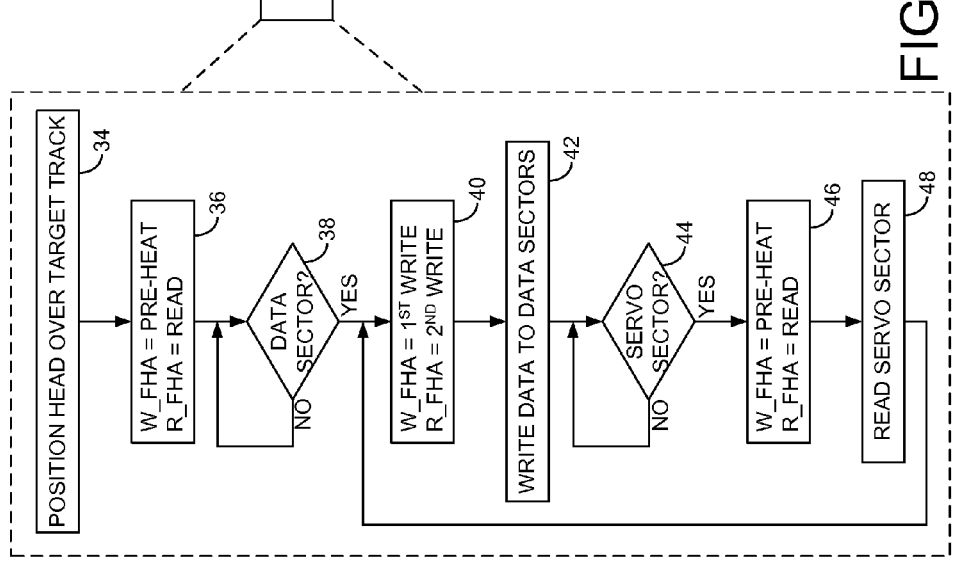
FIG. 2C

US 8,576,509 B1

DISK DRIVE CONFIGURING DUAL FLY HEIGHT ACTUATORS DURING WRITE OPERATION

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

FIG. 1 shows a prior art format of a disk 2 comprising a plurality of concentric servo tracks 4 defined by embedded servo sectors $6_0$-$6_N$. A plurality of data tracks are defined relative to the servo tracks 4, wherein the density of the data tracks may be different (e.g., higher) than the servo tracks 4. Each servo sector (e.g., servo sector $6_4$) comprises a preamble 8 for synchronizing gain control and timing recovery, a sync mark 10 for synchronizing to a data field 12 comprising the coarse head positioning information (such as a Gray coded track ID), and servo bursts 14 which provide fine head positioning information. The head is positioned relative to the servo tracks 4 in order to position the head over a target data track.

The ability of the disk drive to accurately recover data recorded on the disk is affected by the fly height of the head during both write and read operations. Accordingly, disk drives typically employ a suitable fly height actuator (e.g., a heater or a piezoelectric actuator) for dynamically controlling the fly height of the head during write/read operations. The fly height actuator typically comprises a digital-to-analog converter (DAC) that is programmed with a digital value corresponding to a target fly height.

BRIEF DESCRIPTION OF THE DRAWINGS

FIG. 2A shows a disk drive according to an embodiment of the present invention comprising a head actuated over a disk.

FIG. 2B shows a head according to an embodiment of the present invention comprising a write fly height actuator and a read fly height actuator.

FIG. 2C is a flow diagram according to an embodiment of the present invention wherein during a write operation the write/read fly height actuators are configured into a pre-heat, write, and servo sector mode.

DETAILED DESCRIPTION OF EMBODIMENTS OF THE INVENTION

Figure 1:
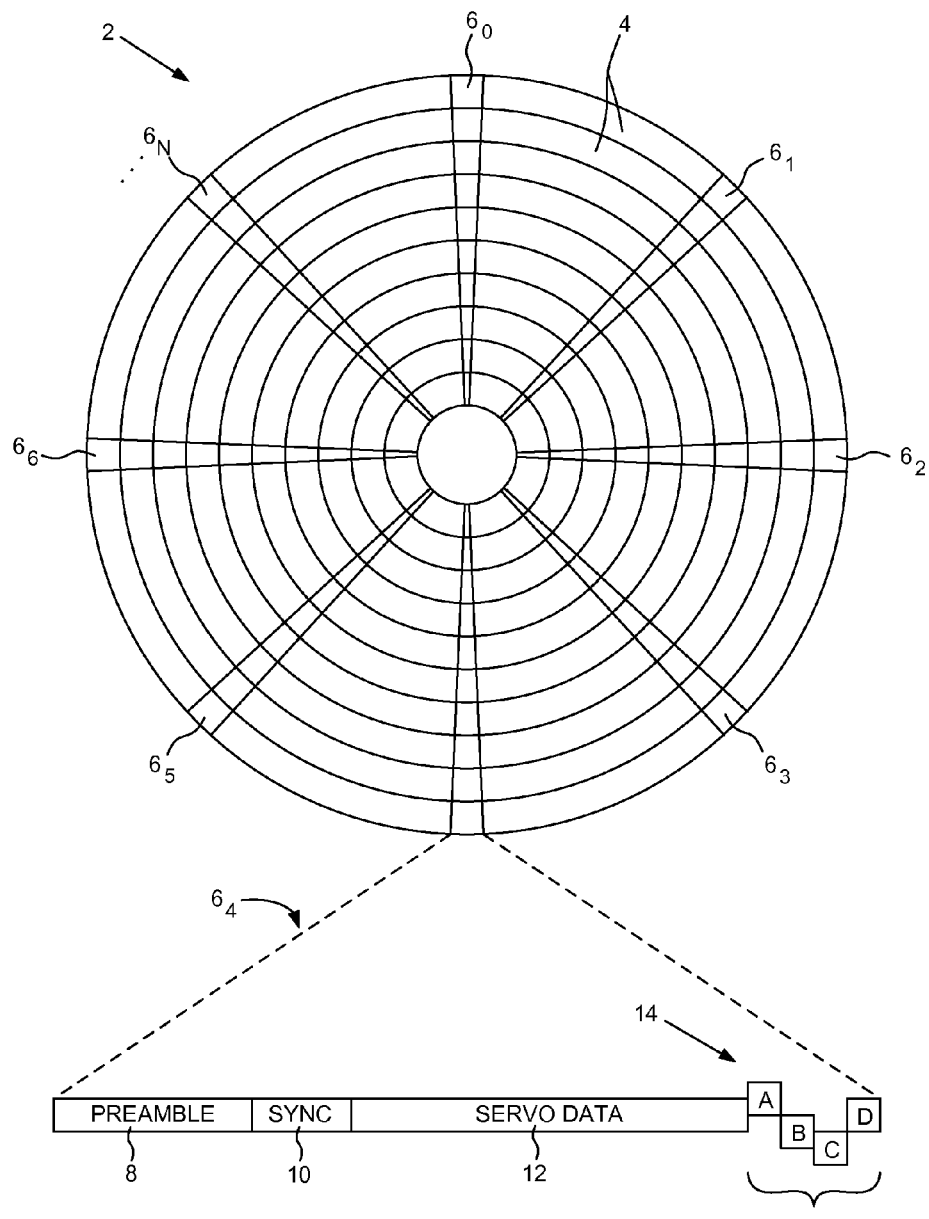
FIG. 1 shows a prior art disk format comprising a plurality of servo tracks defined by embedded servo sectors.

FIG. 2A shows a disk drive according to an embodiment of the present comprising a disk 16 including a plurality of data tracks 18 defined by servo sectors $20_0$-$20_N$, wherein each data track 18 comprises a plurality of data sectors. The disk drive further comprises a head 22 actuated over the disk 16, where FIG. 2B shows an example head 22 comprising a write element 24, a write fly height actuator (W_FHA) 26, a read element 28, and a read fly height actuator (R_FHA) 30. The disk drive further comprises control circuitry 32 operable to execute a write operation to a plurality of target data sectors by executing the flow diagram of FIG. 2C. The head is positioned over a target data track comprising the target data sectors (step 34). When the head is approaching the target data sectors (step 38), the write fly height actuator is configured with a pre-heat value and the read fly height actuator is configured with a read value (step 36). When the head is over one of the target data sectors, the write fly height actuator is configured with a first write value and the read fly height actuator is configured with a second write value (step 40), and data is written to the target data sector (step 42). When the head transitions from writing data to the target data sector to reading a servo sector (step 44), the write fly height actuator is configured with the pre-heat value and the read fly height actuator is configured with a read value (step 46). After reading the servo sector (step 48), the write fly height actuator is configured with the first write value and the read fly height actuator is configured with the second write value (step 40), and writing data to the target data sectors continues (step 42).

In the embodiment of FIG. 2A, the control circuitry 32 processes a read signal 50 emanating from the head 22 to demodulate the servo sectors $20_0$-$20_N$ and generate a position error signal (PES) representing an error between the actual position of the head and a target position relative to a target track. The control circuitry 32 filters the PES using a suitable compensation filter to generate a control signal 52 applied to a voice coil motor (VCM) 54 which rotates an actuator arm 56 about a pivot in order to actuate the head 22 radially over the disk in a direction that reduces the PES. The servo sectors $20_0$-$20_N$ may comprise any suitable position information, such as a track address for coarse positioning and servo bursts for fine positioning.

Any suitable actuator may be employed to implement the write fly height actuator 26 and the read fly height actuator 30 in the embodiments of the present invention. In one embodiment, the actuators may comprise a thermal element that expands with temperature, wherein a current applied to the thermal element controls the temperature and corresponding fly height. In an alternative embodiment, a piezoelectric actuator may be employed which deflects when excited with a control signal (e.g., voltage) to control the fly height.

In the embodiments of the present invention, using dual fly height actuators enables independent fly height control of the write element 24 and the read element 28. For example, during a write operation it is desirable to increase the fly height of the read element to protect against damage due to contact with thermal asperities on the disk. It is also desirable to pre-heat the write element prior to actually writing data to the disk during a write operation. However, when writing data to the disk there is a need to quickly transition from the write mode into a read mode in order to read a servo sector during a servo sector interrupt. Accordingly, there is a need to quickly adjust the fly height of the read element 28 during a write operation in order to read a servo sector.

To facilitate the different fly heights configured during a write operation, the write fly height actuator 26 and the read fly height actuator 30 are activated simultaneously so that the combined actuation provides the desired fly height of both the write element 24 and the read element 28. In effect, both the write and read fly height actuators are biased during the write operation, wherein the bias for both fly height actuators are adjusted by a relatively small amount to change the fly height as compared to independently controlling the writer and reader fly heights. In this manner, the response time of the fly height actuators is faster since each actuator need only change by a small amount in order to adjust the fly height of the write element 24 and read element 28 during the different stages of a write operation.

Figure 3:
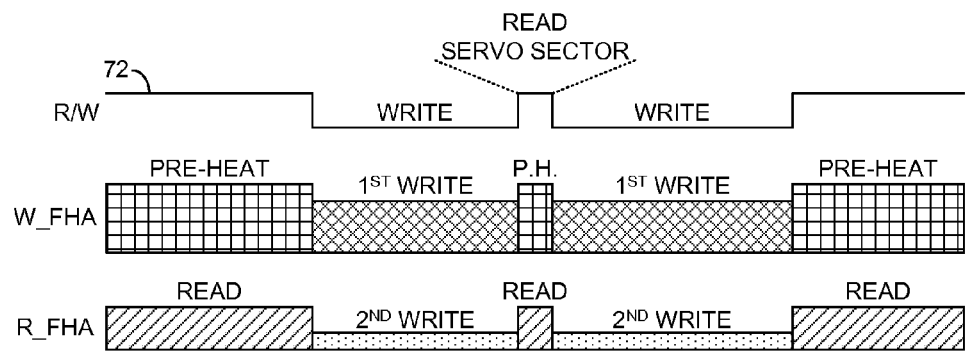
FIG. 3 illustrates how the write/read fly height actuators are configured during a write operation, including to read servo sectors, according to an embodiment of the present invention.

FIG. 3 illustrates an embodiment of the present invention wherein during a write operation the write fly height actuator (W_FHA) is configured with a pre-heat value, and the read fly height actuator (R_FHA) is configured with a read value in order to adjust the fly height of the write element 24 toward the target value. When the head is over a target data sector, the W_FHA is configured with a first write value and the R_FHA is configured with a second write value, wherein the combined actuation provides the target fly height for the write element 24 while writing data to the disk. When the head transitions from writing data to the target data sector to reading a servo sector, the W_FHA is configured with the pre-heat value and the R_FHA is configured with the read value, wherein the combined actuation provides the target fly height for the read element 28 while reading the servo sector. After reading the servo sector, the W_FHA is configured with the first write value and the R_FHA is configured with the second write value, wherein the combined actuation provides the target fly height for the write element 24 to continue writing data to the disk.

In the embodiment of FIG. 3, the first write value is less than the pre-heat value to account for a heating action of the write element 24 while writing data to the target data sectors. For example, the write element may comprise an inductive coil that generates heat when energized with current in order to write magnetic transitions on the disk. Also in the embodiment of FIG. 3, the second write value is less than the read value to account for the heating action of the write element while writing data to the target data sectors, and the second write value is less than the first write value so that the read element 28 flies higher than the write element 24 while writing data to the target data sectors.

The write/read fly height actuators may be configured with the control values shown in FIG. 3 using any suitable technique. In one embodiment, the control circuitry 32 programs a plurality of registers that are selected based on a read/write (R/W) control signal. In one embodiment, the control circuitry 32 programs a first register with a first value and a second register with a second value. The control circuitry 32 then uses the first register to configure the write fly height actuator with the pre-heat value and uses the second register to configure the write fly height actuator with the first write value. The control circuitry programs a third register with a third value and a fourth register with a fourth value, and then uses the third register to configure the read fly height actuator with the read value and uses the fourth register to configure the read fly height actuator with the second write value.

Figure 4A:
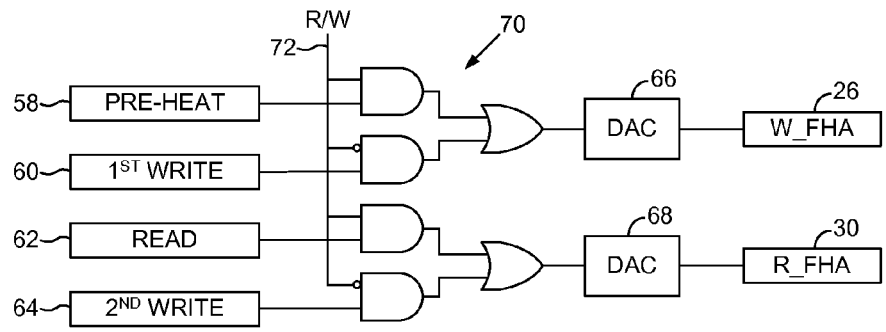
FIG. 4A shows control circuitry according to an embodiment of the present invention for configuring the write/read fly height actuators.

FIG. 4A shows control circuitry according to an embodiment of the present invention comprising a first register 58 programmed with the pre-heat value, a second register 60 programmed with the first write value, a third register 62 programmed with the read value, and a fourth register 64 programmed with the second write value. The control circuitry further comprises a first digital-to-analog converter (DAC) 66 for applying a control signal to the W_FHA 26, and a second DAC 68 for applying a control signal to the R_FHA 30. Multiplexing circuitry 70 is configured with a R/W control signal 72 in order to apply the appropriate register values to the DACs 66 and 68 as described above with reference to FIG. 3.

Figure 4B:
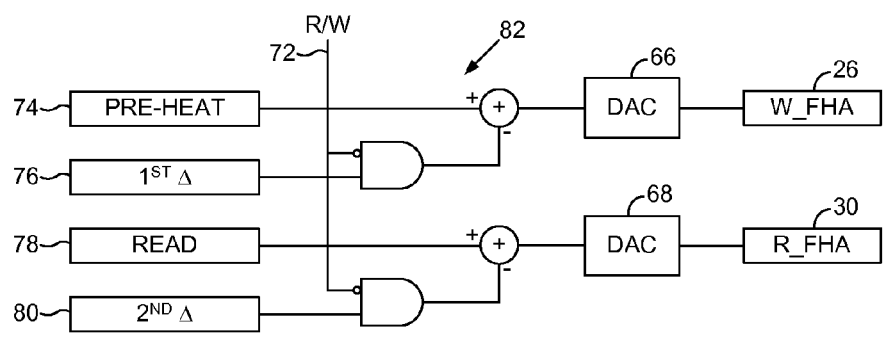
FIG. 4B shows an alternative embodiment of the control circuitry for configuring the write/read fly height actuators.

FIG. 4B shows control circuitry according to an alternative embodiment of the present invention comprising a first register 74 programmed with the pre-heat value, a second register 76 programmed with a first delta value, a third register 78 programmed with the read value, and a fourth register 80 programmed with a second delta value. In this embodiment, the R/W signal 72 configures logic circuitry 82 to subtract the first delta value from the pre-heat value and to subtract the second delta value from the read value while writing data to the target data sectors, thereby configuring the first DAC 66 with the first write value and the second DAC 68 with the second write value as described above with reference to FIG. 3.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:
1. A disk drive comprising:
a disk comprising a plurality of data tracks defined by servo sectors, wherein each data track comprises a plurality of data sectors;
a head actuated over the disk, the head comprising:
  a write element;
  a write fly height actuator;
  a read element; and
  a read fly height actuator; and
control circuitry operable to execute a write operation to a plurality of target data sectors by:
  positioning the head over a target data track comprising the target data sectors;
  when the head is approaching the target data sectors, configuring the write fly height actuator with a pre-heat value and configuring the read fly height actuator with a read value;
  when the head is over one of the target data sectors, configuring the write fly height actuator with a first write value and configuring the read fly height actuator with a second write value, and writing data to the target data sector;
  when the head transitions from writing data to the target data sector to reading a servo sector, configuring the write fly height actuator with the pre-heat value and configuring the read fly height actuator with a read value; and after reading the servo sector, configuring the write fly height actuator with the first write value and configuring the read fly height actuator with the second write value, and continue writing data to the target data sectors.

2. The disk drive as recited in claim 1, wherein the first write value is less than the pre-heat value to account for a heating action of the write element while writing data to the target data sectors.

3. The disk drive as recited in claim 1, wherein the second write value is less than the read value to account for a heating action of the write element while writing data to the target data sectors.

4. The disk drive as recited in claim 1, wherein the second write value is less than the first write value so that the read element flies higher than the write element while writing data to the target data sectors.

5. The disk drive as recited in claim 1, wherein the control circuitry is further operable to execute the write operation by:
   programming a first register with a first value and a second register with a second value;
   using the first register to configure the write fly height actuator with the pre-heat value and using the second register to configure the write fly height actuator with the first write value;
   programming a third register with a third value and a fourth register with a fourth value; and
   using the third register to configure the read fly height actuator with the read value and using the fourth register to configure the read fly height actuator with the second write value.

6. The disk drive as recited in claim 5, wherein:
   the first value equals the pre-heat value;
   the second value equals the first write value;
   the third value equals the read value; and
   the fourth value equals the second write value.

7. The disk drive as recited in claim 5, wherein the control circuitry is further operable to generate at least one of the pre-heat value and the first write value by combining the first and second values.

8. The disk drive as recited in claim 5, wherein the control circuitry is further operable to generate at least one of the read value and the second write value by combining the third and fourth values.

9. The disk drive as recited in claim 5, wherein the control circuitry is further operable to execute the write operation by:
   configuring a read/write signal based on whether the head is writing data to the target data sectors; and
   configure the first, second, third, and fourth registers in response to the read/write signal.

10. A method of operating a disk drive, the disk drive comprising a disk comprising a plurality of data tracks defined by servo sectors, wherein each data track comprises a plurality of data sectors, and a head actuated over the disk, the head comprising a write element, a write fly height actuator, a read element, and a read fly height actuator, the method comprising executing a write operation to a plurality of target data sectors by:

positioning the head over a target data track comprising the target data sectors;

when the head is approaching the target data sectors, configuring the write fly height actuator with a pre-heat value and configuring the read fly height actuator with a read value;

when the head is over one of the target data sectors, configuring the write fly height actuator with a first write value and configuring the read fly height actuator with a second write value, and writing data to the target data sector;

when the head transitions from writing data to the target data sector to reading a servo sector, configuring the write fly height actuator with the pre-heat value and configuring the read fly height actuator with a read value; and after reading the servo sector, configuring the write fly height actuator with the first write value and configuring the read fly height actuator with the second write value, and continue writing data to the target data sectors.

11. The method as recited in claim 10, wherein the first write value is less than the pre-heat value to account for a heating action of the write element while writing data to the target data sectors.

12. The method as recited in claim 10, wherein the second write value is less than the read value to account for a heating action of the write element while writing data to the target data sectors.

13. The method as recited in claim 10, wherein the second write value is less than the first write value so that the read element flies higher than the write element while writing data to the target data sectors.

14. The method as recited in claim 10, further comprising:
   programming a first register with a first value and a second register with a second value;
   using the first register to configure the write fly height actuator with the pre-heat value and using the second register to configure the write fly height actuator with the first write value;
   programming a third register with a third value and a fourth register with a fourth value; and
   using the third register to configure the read fly height actuator with the read value and using the fourth register to configure the read fly height actuator with the second write value.

15. The method as recited in claim 14, wherein:
   the first value equals the pre-heat value;
   the second value equals the first write value;
   the third value equals the read value; and
   the fourth value equals the second write value.

16. The method as recited in claim 14, further comprising generating at least one of the pre-heat value and the first write value by combining the first and second values.

17. The method as recited in claim 14, further comprising generating at least one of the read value and the second write value by combining the third and fourth values.

18. The method as recited in claim 14, further comprising:
   configuring a read/write signal based on whether the head is writing data to the target data sectors; and
   configure the first, second, third, and fourth registers in response to the read/write signal.

\* \* \* \* \*